United States Patent [19]

Hochbein

[11] Patent Number: 4,593,848
[45] Date of Patent: Jun. 10, 1986

[54] BUTTON CONTACT JOINING MACHINE

[75] Inventor: David E. Hochbein, Sarver, Pa.

[73] Assignee: Aluminum Company of America, Pittsburgh, Pa.

[21] Appl. No.: 695,524

[22] Filed: Jan. 28, 1985

[51] Int. Cl.[4] .................... B23K 20/12; B23K 20/24
[52] U.S. Cl. .......................................... 228/2; 228/13; 228/18; 228/113; 228/114; 228/118; 228/170
[58] Field of Search ...................... 228/2, 18, 13, 112, 228/113, 114, 119, 170, 172

[56] References Cited

U.S. PATENT DOCUMENTS

| 2,942,748 | 6/1960 | Anderson | 228/112 |
| 3,616,980 | 11/1971 | Padilla | 228/112 |
| 3,693,238 | 9/1972 | Hoch et al. | 228/170 |
| 3,704,821 | 12/1972 | Loyd et al. | 228/112 |
| 3,853,258 | 12/1974 | Louw et al. | 228/2 |
| 4,122,990 | 10/1978 | Tasaki et al. | 228/2 |

OTHER PUBLICATIONS

Elcock, "Design Engineering", pp. 67-70, Jul. 1970.

Primary Examiner—Gene P. Crosby
Assistant Examiner—Samuel M. Heinrich
Attorney, Agent, or Firm—Elroy Strickland

[57] ABSTRACT

A portable apparatus for friction joining metal pieces to an electrical conductor while the conductor is carrying electrical current. The apparatus comprises a spindle adapted to receive and to hold a metal piece in a forward end thereof for rotation against the conductor, and structure is provided for translating the spindle toward and away from the conductor. An air operated motor and flywheel are provided for rotating the spindle, and structure is provided for supporting the apparatus on the conductor.

3 Claims, 5 Drawing Figures

BUTTON CONTACT JOINING MACHINE

BACKGROUND OF THE INVENTION

The present invention relates generally to friction joining of metal items together and particularly to a portable device capable of joining an electrical contact button to a fixed electrical conductor while the conductor is conducting massive amounts of current and producing magnetic fields of substantial strength.

Aluminum is made, i.e., reduced from aluminum oxide in a Hall cell by directing large amounts of current through an electrolytic bath containing the aluminum oxide. Large carbon anodes are disposed in the electrolyte and substantial amounts of current are directed into the electrolyte through the anodes. In the process of reducing the aluminum, the carbon of the anode combines with the oxygen of the aluminum oxide such that the anode is consumed in the process. This requires regular periodic replacement of the consumed anodes with new anodes.

The replacement process is facilitated by supporting the anodes on metal bars that are clamped to a large electrical bus that feeds the anodes with the electrical current. On the broad face of the bus are electrical contact buttons that firmly engage and contact the bar when the bar is clamped to the bus.

If contact pressures are not adequate between the anode bar and the button, arcing tends to occur between the bar and the button which increases the electrical resistance between the bar and the button. The increased resistance lowers the flow of current in the cell such that the cell itself becomes less efficient in producing the aluminum. The button, in turn, becomes eroded due to the arcing and must be removed from the bus and a new one welded in place. The large amount of current flow in the bus produces a high strength magnetic field around the bus such that conventional welding techniques are adversely affected, i.e., the bond effected by such techniques is only marginal at best.

When new buses are constructed, the contact buttons can be welded thereon without concern for a potential on and current flow through such buses, as the buses are unconnected and not associated with an operating cell. In order to join new contact buttons to bus bars that are in use in a potline of Hall cells, however, any cell or pot in the line that needs replacement buttons must be disconnected and thereby electrically isolated from the line before personnel can remove the old buttons and weld new ones in their place. The removal of a pot (cell) from a potline is economically costly as the production of the pot is totally interrupted.

BRIEF SUMMARY OF THE INVENTION

The present invention is directed to a portable apparatus for joining together metal workpieces, including joining contact buttons to current conducting buses without grounding the buses. The apparatus is capable of being moved from place to place on any single cell, and from cell to cell in a pot room.

More particularly, the apparatus comprises a spindle for receiving and holding a button to be joined to a conductor, and air motor and flywheel that rotates the spindle to effect the joining process by virtue of a friction weld. A second air operated motor, in combination with a worm gear and screw thread system, translates the spindle to and from the conductor. By virtue of the use of air operated motors, no electrical leads are required that may serve as means to ground the conductor (bus) carrying electrical current. Rather, the apparatus is connected to a source of air such as plant air by electrically insulating hoses. This also insures protection for personnel using the apparatus, as the potential on a given cell to ground can be substantial though the voltage drop across any individual cell is relatively low.

BRIEF DESCRIPTION OF THE DRAWINGS

The invention, along with its objectives and advantages, will be best understood from the following detailed description and the accompanying drawings in which:

FIG. 1b is a second partial longitudinal section of the apparatus and complement to FIG. 1a;

FIG. 1c is a view of an upper portion of the apparatus of FIGS. 1a and 1b, as taken from line 1c in FIG. 1a;

FIG. 2 is a cross-sectional view of the apparatus taken along lines 2—2 in FIG. 1a.

Figure 1A:
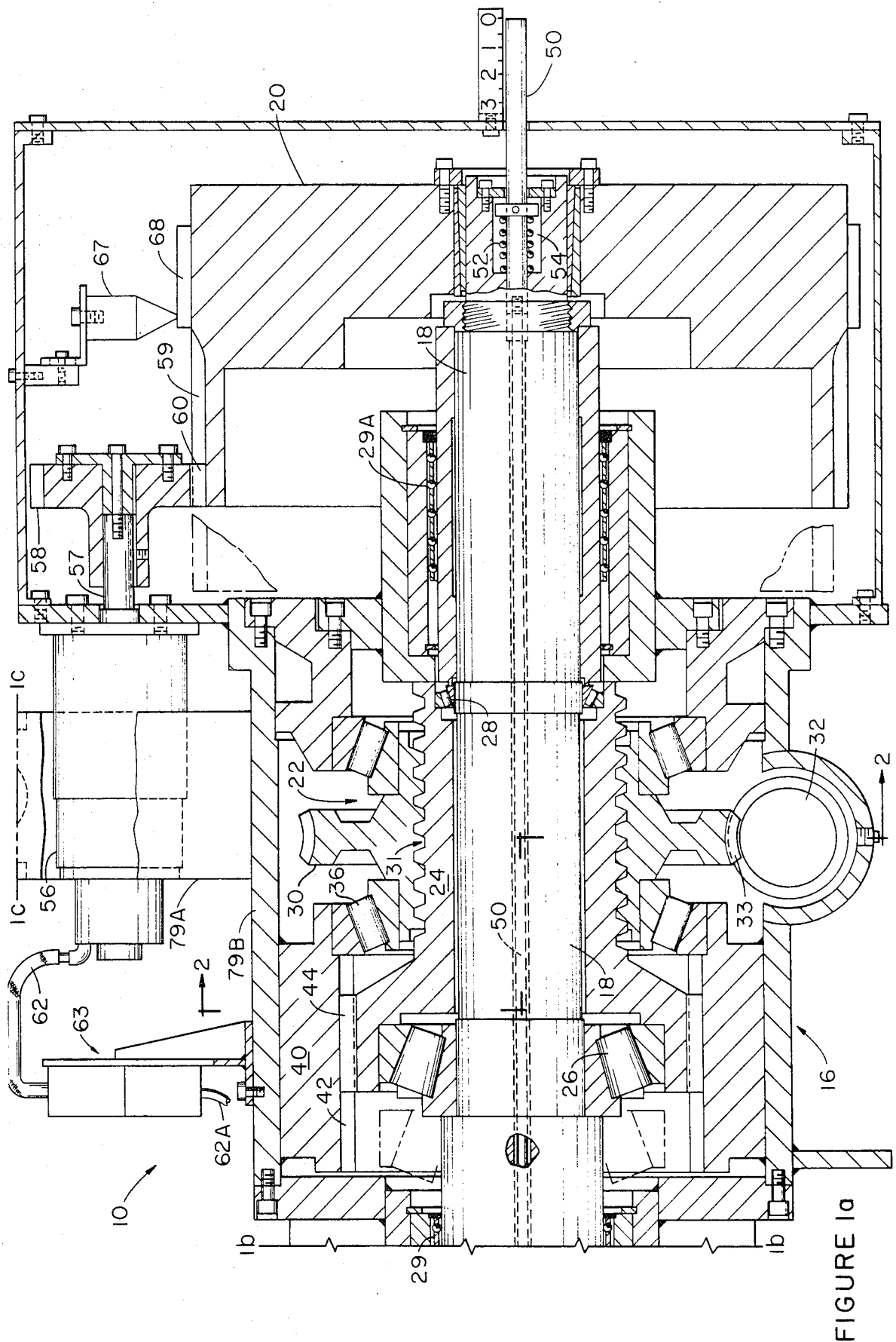
FIG. 1a is a partial longitudinal section of the apparatus of the invention.
Figure 1B:
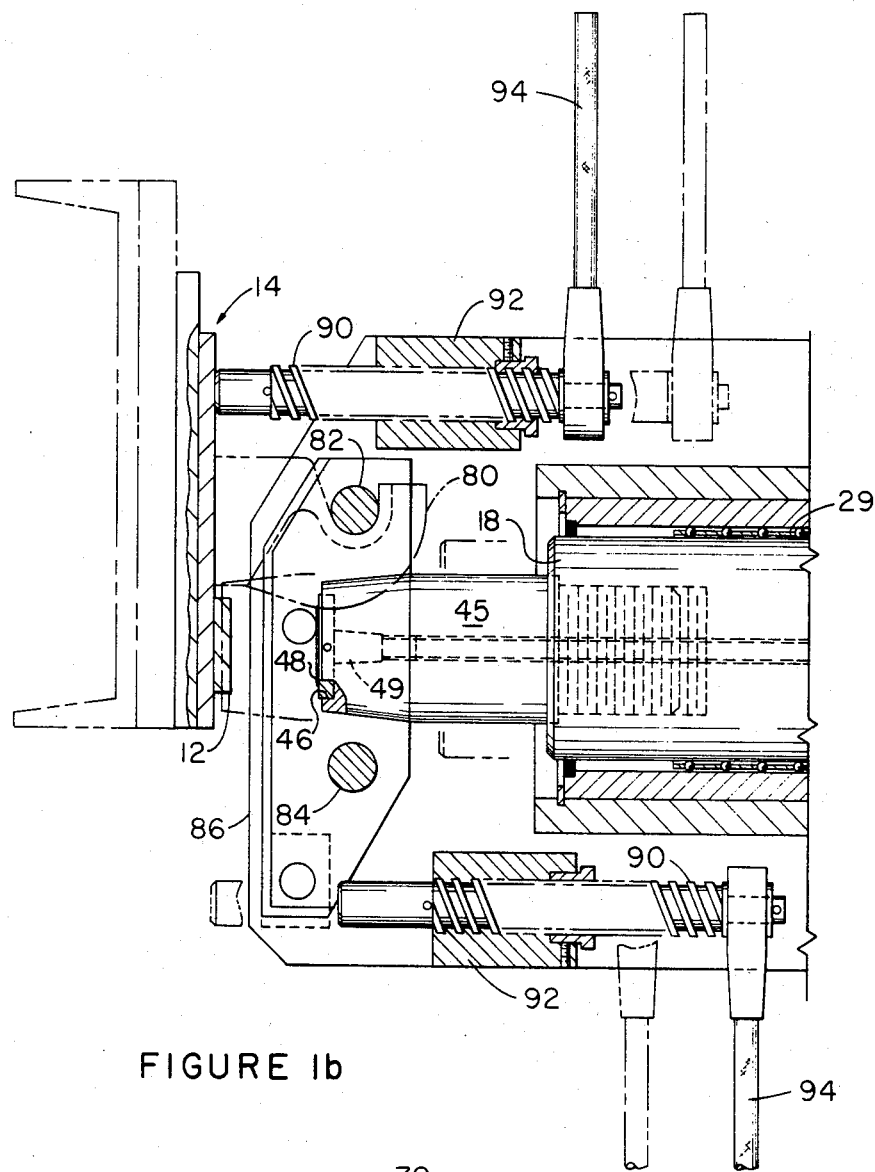
Figure 3:
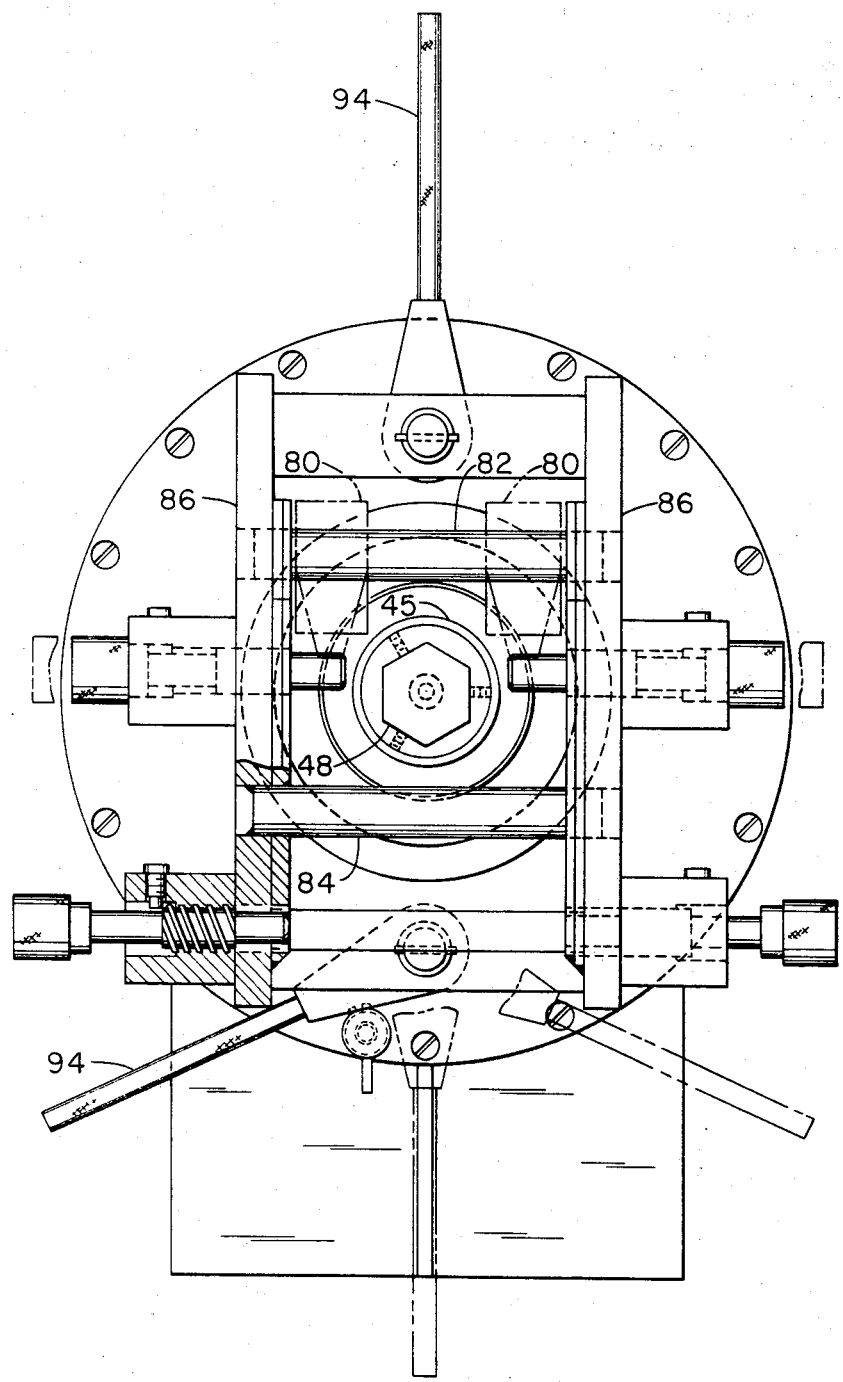
FIG. 3 is a partial-front elevation view of the apparatus of the invention.

Referring now to the drawings, FIGS. 1a and 1b thereof show in longitudinal section an apparatus 10 for conveniently joining electrical contact buttons 12 on an electrical bus 14 while the bus is carrying current. (Bus 14 is shown in FIG. 1 in partial section and is part of a system supplying current to a Hall cell, not shown, though the invention is not limited to such use.) Buttons 12 are preferably hexagon shape, as shown in FIG. 3, such that they can be held against rotation within the end or head of a spindle, discussed in detail hereinafter.

Apparatus 10 comprises a main housing and frame 16, a spindle 18 mechanically connected to a flywheel 20 and a worm gear and threaded screw means designated generally by numeral 22, all housed in frame 16. The spindle extends longitudinally through the center of a threaded screw 24 (of 22) and is mounted for rotation within the screw by thrust bearings 26 and 28. Spindle 18 is also mounted for lateral translation within frame 16 by bearing means 29 and 29A located adjacent the forward and rearward ends of the apparatus. Such bearing means allows the spindle to slide within the frame of the apparatus for purposes discussed hereinafter.

Screw 24, in turn, is located in an annular gear 30 and threadably engages the same via mating threads 31; the mating threads are located on the outside surface of screw 24 and on the inside surface of gear 30.

Figure 2:
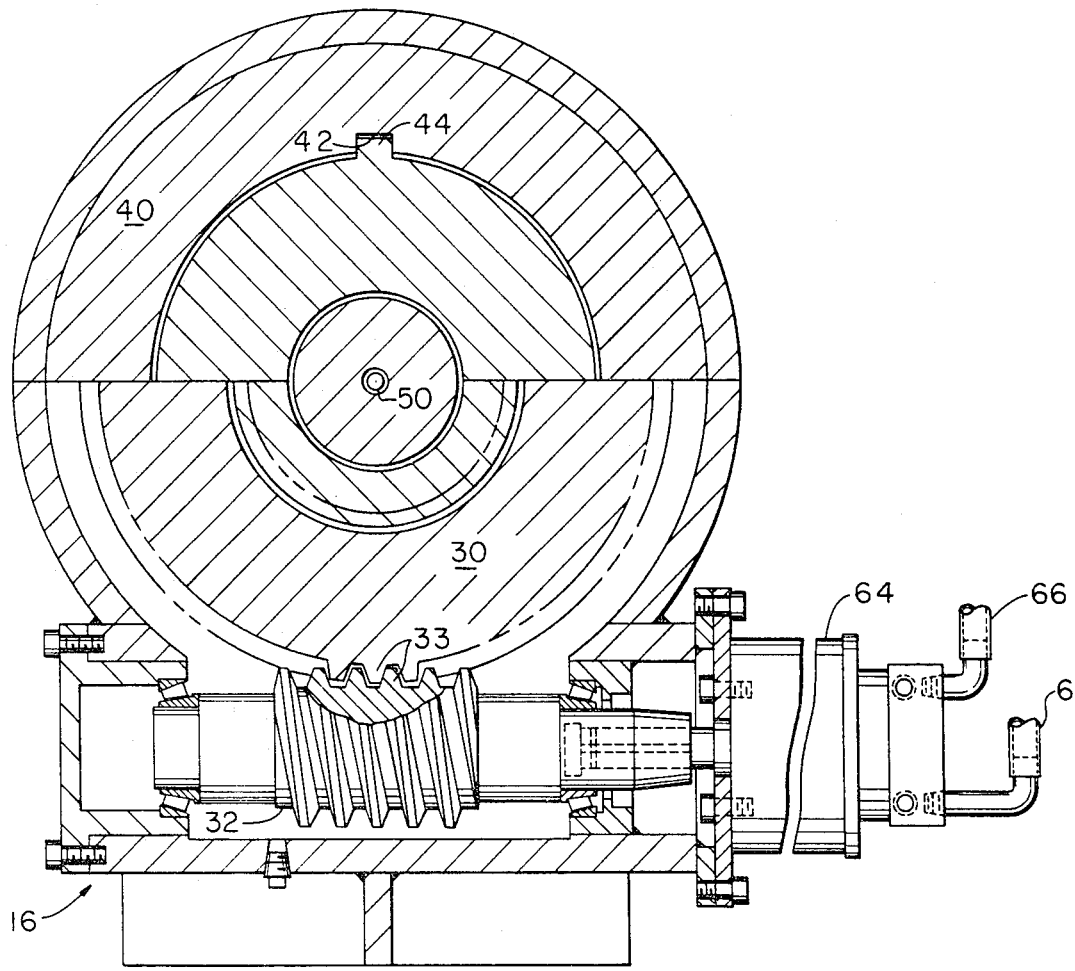

The outside periphery of gear 30 engages a worm gear 32 via mating threads 33. These threads are best seen in FIG. 2. Gear 30 is rotatable about screw 24 and is mounted for such rotation by thrust bearings 36 and 38.

Thrust bearings 36 are mounted in association with a fixed member 40, i.e., fixed in relation to frame 16. (A similar structure 41 supports bearings 38.) Fixed member 40 is provided with an upper and a lower keyway or slot 42 that receives in mating relationship an integral boss 44 of screw 24. The upper slot and boss are shown in cross section in FIG. 2.

The forward end of spindle 18 (FIG. 1b) includes a head or chuck 45 which is provided with a recess 46 for receiving a button contact 12. (In FIG. 1b the forward end of the spindle is depicted in both phantom outline and in elevation to show forward and retracted positions discussed in detail below.)

The size (breadth) and configuration of recess 46 (FIG. 3) is substantially the same as that of the contact 12 such that it seats in the recess and is held against relative rotation with respect to the spindle, as mentioned earlier. The depth of the recess is such that an exposed portion of the contact is available for engaging bus 14 for the joining process.

The recess 46 of the spindle is also adapted to receive a milling cutter 48 in the manner shown in FIG. 1b. The cutter has dimensions and a configuration similar to contact button 12. The purpose of cutter 48 is to remove old contacts 12 from bus 14 before a new contact is welded to the bus. As shown in FIG. 1b, the cutter has a shank portion 49 that extends into the end of spindle 18. An elongated rod 50 is located behind the shank and extends therefrom to the opposite end of the spindle (at the right-hand side of FIG. 1a) and through the housing of the apparatus so that the end of the rod is exposed at the rear of the apparatus. A coil spring 52 is shown disposed about the right-hand end of the rod and captured in a recess 54 provided at the rear of the spindle to bias the rod in a retracted position. The purpose of the rod is to remove the cutter from the head of the spindle after the old contact is removed from the bus so that a new contact can be disposed in the head.

The flywheel 20 of the apparatus of the invention is rotated by an air operated motor 56. As seen in FIG. 1 of the drawings, the motor is shown attached to the outside of the housing with a shaft 57 of the motor extending through the housing and into a gear 58. Gear 58 engages a peripheral portion 59 of the flywheel via a set of mutually engaged teeth 60.

Motor 56 is connected to a source of pressurized air, such as the supply of air ordinarily available in a plant or factory, via a hose 62. Hose 62 is shown in FIG. 1a connected to a control box and panel 63, only partially depicted containing electrically operable solenoid valves and a direct current power supply to operate the valves. A second hose 62A connects the valves in 63 to the source of pressurized air. The material of the hoses is electrically insulating so that apparatus 10 cannot be grounded by the hoses.

Threaded worm 32 is rotated by an air operated motor 64 (FIG. 2) connected to one end of the worm. The motor, like that of 56, is connected to a supply of pressurized air (via control valves not shown) by electrically insulating hoses 66. Hoses 66 allow the air to be directed through motor 64 in opposed directions; in this manner the motor is employed to forward and retract spindle 18.

A light source and detector 67 are shown mounted on the inside of housing 16 opposite a light reflecting bar and surface 68 mounted on the periphery of flywheel 20. The detector outputs an electrical pulse each time the bar passes beneath a light beam from the light source as an indication of the velocity of rotation (RPM) of the flywheel. This information is directed to control panel 63 for display for personnel using the welding apparatus.

Figure 1C:
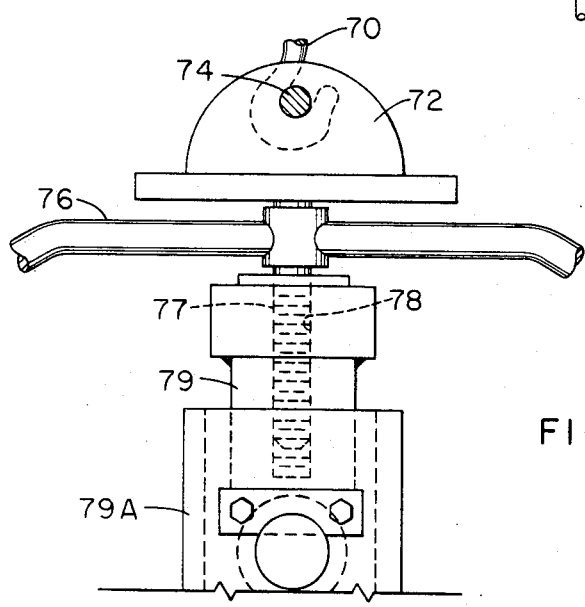

The apparatus of the invention, as thus far described, is compact and portable. Its portability allows it to be placed adjacent the face of a metal member, such as bus 14, for the purpose of joining a metal piece, such as button contact 12, to the member. The portability is effected, for example, by the use of an overhead crane, not shown, having a hook 70 that is electrically insulated from ground. Hook 70 of the crane is shown in FIG. 1c of the drawings located in a structure 72 of the apparatus that is suitably attached to frame and housing 16. Structure 72 is comprised of two spaced apart plates, only one of which is visible in FIG. 1a, and a bar 74 extending between the plates. When the apparatus is to be moved, the hook of the crane is simply inserted between the plates and beneath the bar.

Beneath plates 72 is a handwheel 76 that is attached to vertical screw 77, shown in dash outline in FIG. 1c. The screw extends into a threaded opening 78, also shown in dash outline, provided in an upstanding structure 79. 79 is suitably secured in a structure 79A that is attached to an upper wall 79B of frame 16. Screw 77 provides small increments of vertical adjustment for aligning the machine to the bus bar system (14) of a pot.

On the face of bus 14 are located two horizontally spaced apart hooks 80 (FIG. 3) that support the forward end of apparatus 10 adjacent the bus for the joining process. Only one of the hooks is visible in FIG. 1b. Apparatus 10, in turn, is provided with two trunnions 82 and 84, trunnions 82 and 84 being vertically spaced from each other. The trunnions are secured in opposed vertically extending plates 86 (FIG. 3) that are a part of the housing and the frame of the apparatus. The purpose of two vertically spaced trunnions is to locate head 45 of the apparatus at two vertically spaced locations adjacent the face of the bus. This is required to weld two vertically spaced button contacts 12 on the bus.

Upper and lower threaded shafts 90 are shown provided in a forward wall 92 of the frame and mechanically connected to reversible rachet arms 94 connected to the rearward ends of the shafts.

The operation of apparatus 10 is as follows. An overhead crane (not shown) is positioned to pick up the apparatus and move the same to an operating bus that requires new button contacts. If old contacts are in place they must be removed from the bus by milling cutter 48. This, of course, requires that the cutter be disposed in recess 46 of head 45 for the removal operation.

Trunnions 82 or 84, depending on the location of the old contact to be removed, are seated in hooks 80. Handwheel 76 is rotated by a person in attendance to the joining process to level the apparatus in a manner that locates the face of cutter 48 in parallel relation to the face of bus 14. The rotation of the handwheel rotates vertical screw 77 in threaded opening 78 to effect vertical travel of the apparatus in relation to the crane hook 72.

With the face of cutter 48 in correct parallel relation to the bus and if a lower contact 12 is to be removed, the upper trunnion set 82 is seated in hooks 80. This locates head 45 in the lower position of the two positions provided by the two trunnion sets. This also locates the upper shaft 90 opposite the face of the bus. The upper rachet arm 94 of the shaft is now operated to translate the forward end of the shaft into contact with the bus. As the shaft moves against the bus, the trunnions are forced against the hooks 80 which serve to rigidly fix the apparatus in relation to the bus and to resist the forge force of spindle chuck 45.

Motor 56 is now operated to rotate flywheel 20 and spindle 18 at a velocity sufficient to remove the old button. The velocity is read at 63, which receives velocity information from the output of light detector 67. Air motor 64 is operated in a forward manner, i.e., in a manner that translates spindle 18 toward the bus. The motor does this by rotating worm gear 32, which in turn, rotates annular gear 30 within thrust bearings 36 and 38. The mating teeth 31 of the annular gear and of screw 24 move screw 24 and spindle 18 forward until the milling cutter abuts firmly against the old contact 12.

Spindle 18 (and cutter 48) is rotated until the old contact is machined from the surface of bus 14. During this time motor 64 maintains the head and cutter in a forward position until the contact material is completely removed.

Motor 64 is now operated in a reverse manner to translate the spindle and head away from the bus. The cutter is removed from the head by hitting the exposed right-hand end of rod 50; rod 50 abuts against the shank 49 of the cutter and forces the same from recess 46.

The apparatus of the invention is now ready to join a new button contact 12 to bus 14. A new contact is therefore disposed in the recess of the head. (The trunnions have remained seated in the hooks and shaft 90 in a forward position.) If handwheel 76 has not been rotated and the vertical location of apparatus 10 not changed by the crane, the face of the new button is in proper parallel and vertical relation to the face of the bus.

Motor 56 is now operated to rotate flywheel 20 and to increase the RPM thereof until sufficient energy is stored in the flywheel (and in spindle 18) to effect proper joining of the contact to the bus. When such RPM is reached, again indicated by the output of sensor 67, motor 64 is operated to again translate the spindle and head, which is now rotating, toward the bus. Motor 64 causes the new contact to be pressed against the bus under a force sufficient to generate welding heat between the contact and bus over a predetermined period of time. When this period has elapsed, the material of the contact seizes with the material of the bus and thereby stalls motor 56. The joining process is now completed such that motor 64 is operated to retract the spindle from the bus, the new contact leaving the recess in the head as the head is moved back from the bus.

The material of the buses employed in potlines is usually aluminum such that the material of the button 12 is preferably aluminum, as friction joining of similar metals is easier than dissimilar metals. However, the bars that support the anodes in the pots are usually copper. Hence, it is preferable to use copper clad aluminum materials, which are commercially available, for the buttons 12. Such materials comprise an aluminum body having a layer of copper suitably clad to one surface of the body. This provides an exposed aluminum surface for joining to bus 14 and a copper surface for contacting the bar of the anode. If the material of the buses is copper, then copper buttons of course can be easily welded to such buses.

While the invention has been described in terms of preferred embodiments, the claims appended hereto are intended to encompass all embodiments which fall within the spirit of the invention.

What is claimed is:

1. Portable apparatus for inertia welding metal pieces to an electrical conductor while the conductor is carrying electrical current, the conductor having hook structures for supporting the apparatus on the conductor, the apparatus comprising:

a spindle adapted to receive and hold a metal piece in a forward end thereof for rotation against the conductor, means, including an air-operated motor and a bearing-mounted mechanical screw, for translating said spindle toward and away from the conductor, a flywheel and a second air-operated motor for rotating the spindle and metal piece, bar means for seating in the hook structures, translatable threaded shaft means for holding the bar means firmly against the hook structures when the bar means is seated in the hook structures and the shaft means is moved against the conductor, and electrically insulating hoses connecting said motors to a source of pressurized air.

2. The apparatus of claim 1 in which the motors are connected to a source of plant air by the electrically insulating hoses.

3. The apparatus of claim 1 in which the conductor extends in a horizontal direction relative to a vertical position of the apparatus, and means for adjusting the vertical position of the apparatus relative to the conductor.

* * * * *